United States Patent
Shah et al.

(10) Patent No.: US 10,791,218 B2
(45) Date of Patent: Sep. 29, 2020

(54) SENDING PROGRESS UPDATE MESSAGES WHILE A USER IS ON HOLD

(71) Applicant: Avaya Inc., Santa Clara, CA (US)

(72) Inventors: Sandeep Shah, Pune (IN); Pragati Kailash Dhumal, Pune (IN); Aakash Jagad, Pune (IN); Viral Mehta, Surat (IN); Riddhi Kakadia, Pune (IN)

(73) Assignee: Avaya Inc., Santa Clara, CA (US)

( * ) Notice: Subject to any disclaimer, the term of this patent is extended or adjusted under 35 U.S.C. 154(b) by 19 days.

(21) Appl. No.: 15/337,479

(22) Filed: Oct. 28, 2016

(65) Prior Publication Data

US 2018/0124238 A1 May 3, 2018

(51) Int. Cl.
*H04M 3/428* (2006.01)
*H04L 29/06* (2006.01)
*H04M 3/58* (2006.01)

(52) U.S. Cl.
CPC ...... *H04M 3/4285* (2013.01); *H04L 65/1089* (2013.01); *H04L 65/1096* (2013.01); *H04L 65/4015* (2013.01); *H04M 3/58* (2013.01); *H04M 2203/654* (2013.01)

(58) Field of Classification Search
CPC ........ H04M 3/51; H04M 3/4285; H04M 3/58; H04L 51/04; H04L 65/1089; H04L 65/4015; H04L 65/1096
See application file for complete search history.

(56) References Cited

U.S. PATENT DOCUMENTS

| 6,631,412 | B1 | 10/2003 | Glasser et al. |
| 6,728,756 | B1* | 4/2004 | Ohkado ............... G06Q 10/10 709/204 |
| 6,819,759 | B1 | 11/2004 | Khuc et al. |
| 8,234,141 | B1 | 7/2012 | Flockhart et al. |
| 8,634,543 | B2 | 1/2014 | Flockhart et al. |
| 9,178,999 | B1* | 11/2015 | Hegde ............... H04M 3/5232 |
| 9,680,995 | B2 | 6/2017 | Tendick et al. |
| 2003/0174829 | A1* | 9/2003 | Dezonno ............... H04M 3/51 379/265.02 |
| 2006/0128365 | A1* | 6/2006 | Kamdar ............... H04M 3/428 455/414.3 |

(Continued)

OTHER PUBLICATIONS

Official Action for U.S. Appl. No. 15/679,575, dated Feb. 23, 2018, 13 pages.

(Continued)

*Primary Examiner* — Hoon J Chung
(74) *Attorney, Agent, or Firm* — Sheridan Ross P.C.

(57) ABSTRACT

A communication session (e.g., voice or video) is established between a first party and a second party. The communication session is placed on hold or mute by the second party. While the first party is on hold or mute, an event associated with the second party is detected. For example, the second party calls a third party. In response to detecting the event associated with the second party, a progress update message is sent to first party on hold or mute. For example, the progress update message may be a voice message that states the second party (e.g., the contact center agent) is talking to a third party to resolve an issue of the first party. By sending the progress update message, the first party is apprised of the second party's progress in assisting the first party.

20 Claims, 5 Drawing Sheets

(56) References Cited

U.S. PATENT DOCUMENTS

| | | | |
|---|---|---|---|
| 2006/0203994 A1* | 9/2006 | Shaffer | H04M 3/51 |
| | | | 379/266.01 |
| 2010/0325216 A1* | 12/2010 | Singh | G06Q 10/0637 |
| | | | 709/206 |
| 2014/0095633 A1 | 4/2014 | Yoakum | |
| 2014/0282083 A1* | 9/2014 | Gaetano, Jr. | H04L 51/04 |
| | | | 715/752 |
| 2015/0039747 A1 | 2/2015 | Meloche | |
| 2015/0378561 A1 | 12/2015 | Ollinger et al. | |
| 2016/0021247 A1 | 1/2016 | Marimuthu et al. | |
| 2016/0212265 A1 | 7/2016 | Philonenko et al. | |
| 2016/0219149 A1 | 7/2016 | Krishnan et al. | |
| 2017/0078486 A1* | 3/2017 | Koga | H04M 3/5175 |
| 2017/0255680 A1 | 9/2017 | Malatesha et al. | |
| 2018/0012232 A1* | 1/2018 | Sehrawat | G06Q 30/016 |
| 2018/0103149 A1* | 4/2018 | Skiba | H04L 51/02 |
| 2019/0058744 A1 | 2/2019 | O'Connor et al. | |

OTHER PUBLICATIONS

Official Action for U.S. Appl. No. 15/679,575, dated Jun. 25, 2018, 19 pages.

Notice of Allowance for U.S. Appl. No. 15/679,575, dated Feb. 15, 2019, 5 pages.

Official Action for U.S. Appl. No. 15/679,575, dated May 10, 2019, 12 pages.

Notice of Allowance for U.S. Appl. No. 15/679,575, dated Aug. 20, 2019, 5 pages.

* cited by examiner

SENDING PROGRESS UPDATE MESSAGES WHILE A USER IS ON HOLD

BACKGROUND

When a customer calls into a contact center, the customer is usually connected to a contact center agent. For example, the customer is calling to resolve a technical problem with a new version of software. At times, it is necessary for the contact center agent to place the customer on hold. For example, the contact center agent may need to review a document or talk to a technical specialist to help resolve the customer's problem. While the customer is on hold, the customer may hear music on hold or silence. This can lead to frustration if the contact center agent takes a long time to get back to the customer. The customer may think that the contact center agent has forgotten about the customer. This can lead to the customer dropping the call and decreased customer satisfaction.

SUMMARY

These and other needs are addressed by the various embodiments and configurations of the present disclosure. A communication session (e.g., voice or video) is established between a first party and a second party. For example, the first party may be a customer and the second party may be a contact center agent. The communication session is placed on hold or mute by the second party. While the first party is on hold, an event associated with the second party is detected. For example, the second party calls a third party. In response to detecting the event associated with the second party, a progress update message is sent to first party on hold or mute. For example, the progress update message may be a voice message that states the second party (e.g., the contact center agent) is talking to a third party to resolve an issue of the first party. By sending the progress update message, the first party is apprised of the second party's progress in assisting the first party.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112. Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
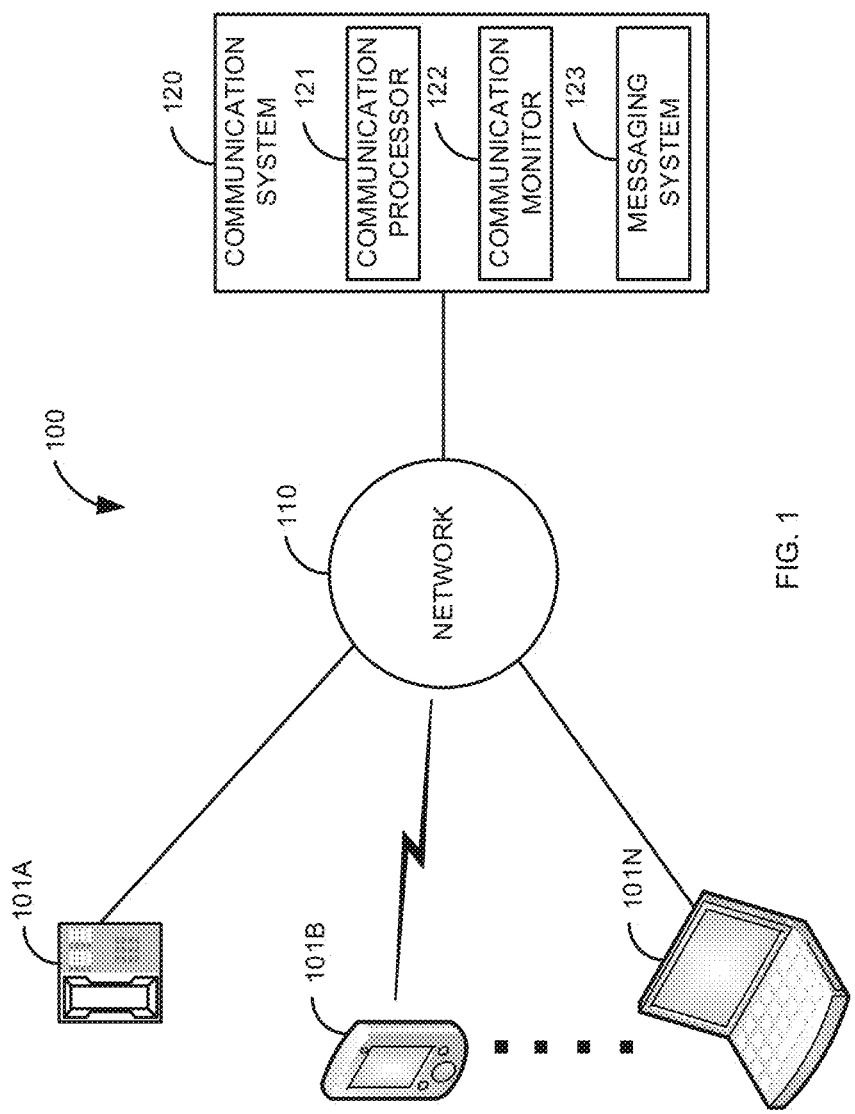
FIG. 1 is a block diagram of a first illustrative system for sending progress update messages while a real-time voice or video communication session is on hold or mute.

FIG. 1 is a block diagram of a first illustrative system 100 for sending progress update messages while a real-time voice or video communication session is on hold or mute. The first illustrative system 100 comprises communication endpoints 101A-101N, a network 110, and a communication system 120.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a smart phone, and/or the like. The communication endpoints 101A-101N are devices where a communication session ends. The communication endpoints 101A-101N are not network elements that facilitate and/or relay a communication session in the network 110, such as a communication manager or router. As shown in FIG. 1, any number of communication endpoints 101A-101N may be connected to the network 110.

The network 110 can be or may include any collection of communications equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, Integrated Services Digital Network (ISDN), video protocols, email protocols, Instant Messaging (IM) protocols, text messaging protocols, and/or the like. Thus, the network 110 is an electronic communication network configured to carry messages via packets and/or circuit switched communications.

The communication system 120 can be or may include any hardware coupled with software that can manage communications on the network 110, such as a Private Branch Exchange (PBX), a central office switch, a proxy server, a session manager, a communication manager, a video switch, a contact center system, and/or the like. The communication system 120 further comprises a communication processor 121, a communication monitor 122, and a messaging system 123.

The communication processor 121 can be any hardware processor coupled with software that can manage, route, and/or control communication sessions, such as a microprocessor, a Digital Signaling Processor (DSP), an application specific processor, and/or the like. The communication processor 121 can manage, route, and/or control, various kinds of communication sessions, such as voice communication sessions, video communication sessions, Instant Messaging (IM) communication sessions, emails, text messaging, multimedia communications, and/or the like. The communication processor 121 can manage communication sessions between any number of the communication endpoints 101A-101N. For example, the communication processor 121 can establish voice and/or video communication sessions between two or more of the communication endpoints 101A-101N. The communications processor 121 can manage, route, and/or control communication sessions using various protocols, such as IP, SIP, H.323, video protocols, IM protocols, text messaging protocols, email protocols, and/or the like.

The communication monitor 122 can be any hardware coupled with software that can monitor a communication session. The communication monitor 122 can monitor a voice or video communication session for specific words, phrases, emotions, gestures, sounds, and/or the like. The communication monitor 122 can also monitor other types of communications sessions, such as Instant Messaging, chat, text messaging, email, and/or the like. For example, the communication monitor 122 can monitor the text of various IM communication sessions, chat, text messaging, and/or emails to provide context for progress update messages sent by the messaging system 123.

The messaging system 123 can send progress update messages to a user that has been placed on hold or mute in response to the detection of one or more events. The progress update messages may be one or more pre-recorded voice messages, one or more pre-recorded video messages, and/or one or more pre-defined text messages. The one or more events may be detected by the communication monitor 122 and/or the communication processor 121.

The first illustrative system 100 may represent a non-contact center environment or a contact center environment. For example, the first illustrative system may represent a company or organization where an incoming call (e.g. from the communication endpoint 101A) is sent to an operator/attendant (e.g., at a front desk) where the caller asks the operator/attendant to connect to a specific department or person (e.g. at communication endpoint 101B) in a company. While the caller is placed on hold or mute, one or more progress update messages may be sent to the caller while the operator/attendant is in the process of determining where to send the call (e.g. to a specific user or voicemail).

Figure 2:
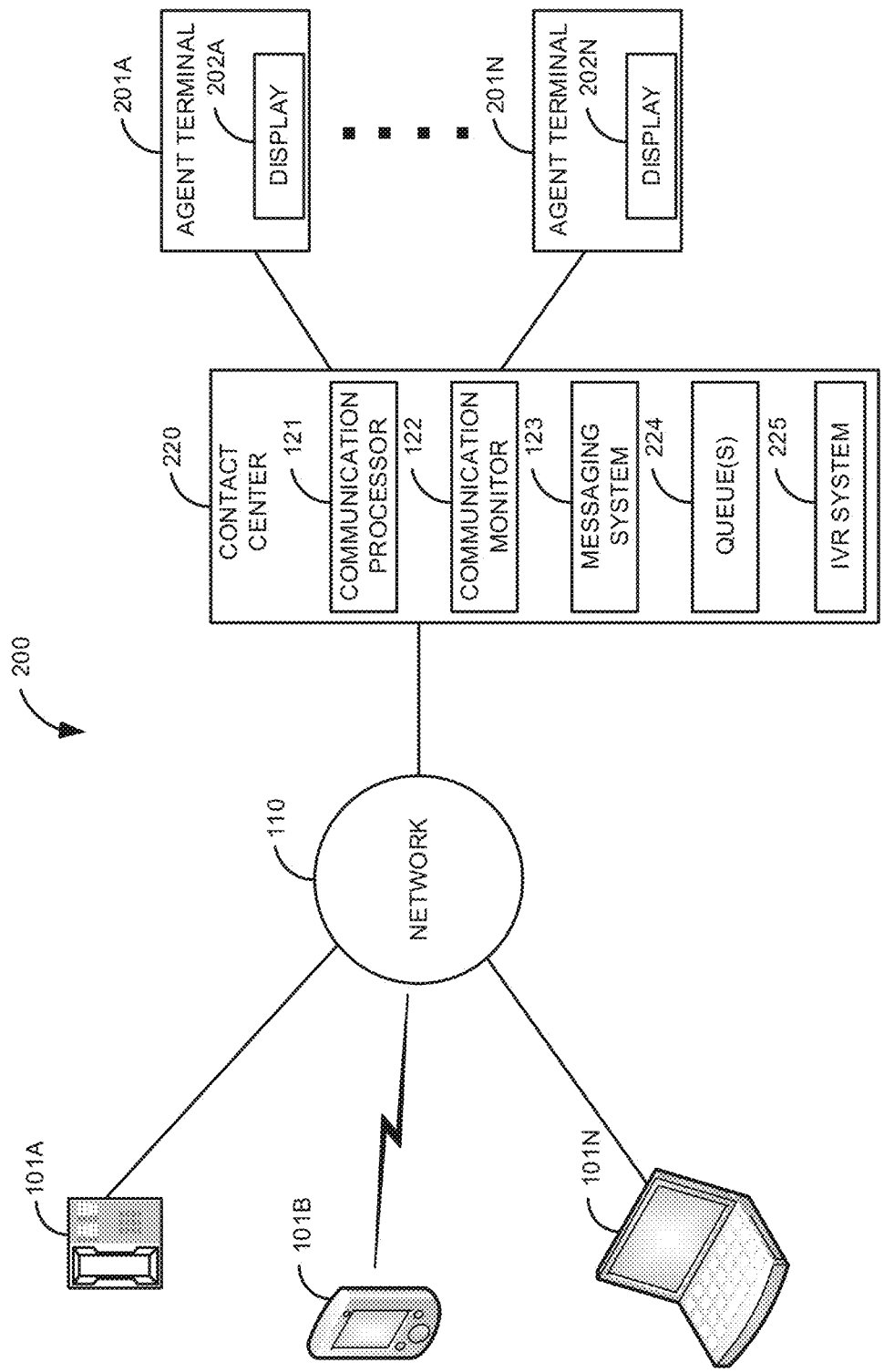
FIG. 2 is a block diagram of a second illustrative system for sending progress update messages while a real-time voice or video communication session is on hold or mute in a contact center.

FIG. 2 is a block diagram of a second illustrative system 200 for sending progress update messages while a real-time voice or video communication session is on hold or mute in a contact center 220. The second illustrative system 200 comprises the communication endpoints 101A-101N, the network 110, the contact center 220, and agent terminals 201A-201N.

In FIG. 2, the communication endpoints 101A-101N are typically customer communication endpoints. The customers typically make real-time voice and/or video calls (from the communication endpoints 101A-101N) into the contact center 220 and are eventually connected to a contact center agent at the agent terminal 201A-201N.

The contact center 220 can provide communication services to customers, such support for health care, insurance, airline, car rental, purchasing, technical support, product returns, and/or the like. The contact center 220 may comprise two or more distributed contact centers 220 at two or more separate locations. For example, the contact center 220 may comprise a contact center located in the United States and a contact center located in India.

The contact center 220 further comprises the communication processor 121, the communication monitor 122, the messaging system 123, contact center queue(s) 224, and an Interactive Voice Response (IVR) system 225. The contact center queue(s) 224 are used to hold communication sessions that are waiting for service by a contact center agent at an agent terminal 201. The contact center 220 may comprise multiple contact center queues 224. For example, the contact center 220 may comprise a contact center queue 224 for product sales and a separate contact center queue 224 for product returns. An incoming communication session may be first received by the IVR system 225, placed into the contact center queue 224 by the IVR system 225, and then routed to a contact center agent when the contact center agent becomes available.

In some embodiments that contact center 220 may not employ contact center queues, but instead the contact center 220 may be a queue-less contact center where communication sessions are placed in a pool for selection by contact center agents.

The IVR system 225 may be used to route voice and/or video communication sessions from customers to a contact center queue 224 and/or agent terminal 201 based on information provided to the IVR system 225 from a customer. For example, the customer may be returning a specific product that is supported by a specific contact center queue 224. Based on input from the customer, via the IVR system 225, the communication processor 121 may route a communication session to a specific contact center queue 224.

The agent terminals 201A-201N may be a communication endpoint 101, a communication device specifically designed for a contact center 220, and/or the like. The agent terminals 201A-201N may comprise one or more communication endpoints 101. For example, the agent terminal 201A may comprise a telephone and a personal computer. The personal computer may be used to display customer information to a contact center agent when a voice communication session is routed to the agent terminal 201. The agent terminals 201A-201N further comprise displays 202A-202N. The display 202 may be used by the contact center agent to select progress update messages to play and/or display to a customer when the customer is placed on hold or mute by the contact center agent (e.g., as discussed in FIGS. 4-5).

Figure 3:
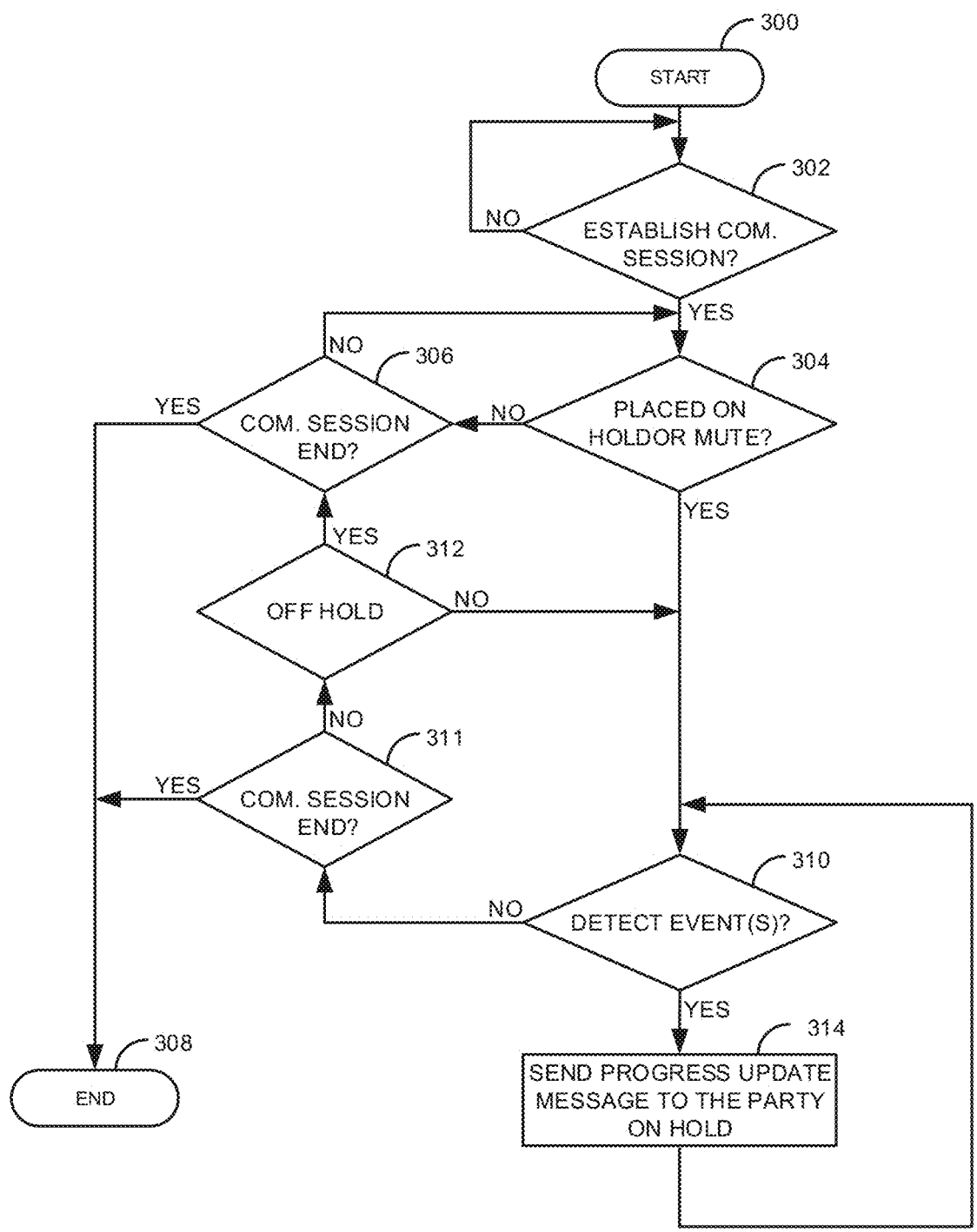
FIG. 3 is a flow diagram of a process for sending progress update messages while a real-time voice or video communication session is on hold or mute.
Figure 4:
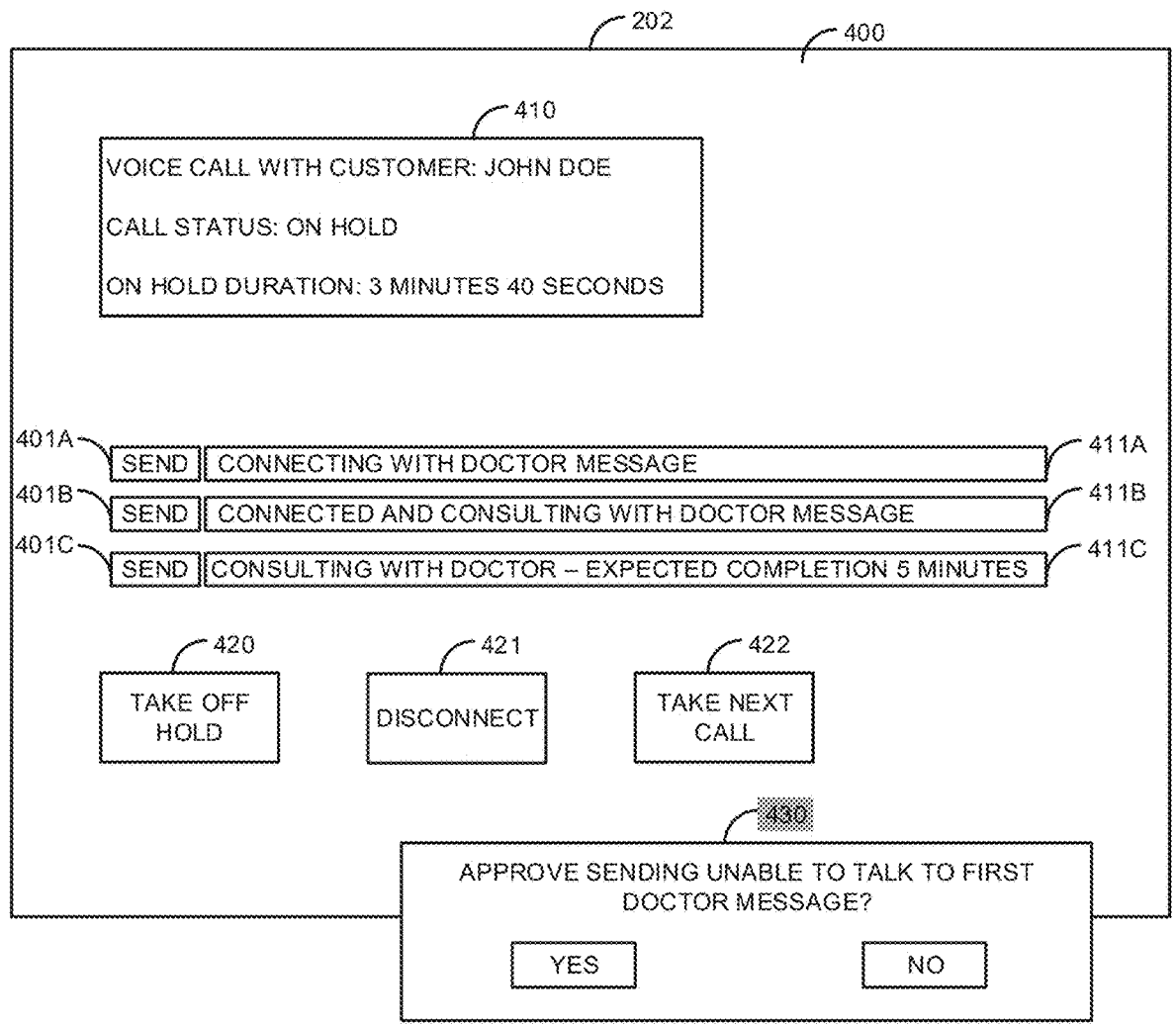
FIG. 4 is a diagram of a user interface for managing progress update messages in a contact center.
Figure 5:
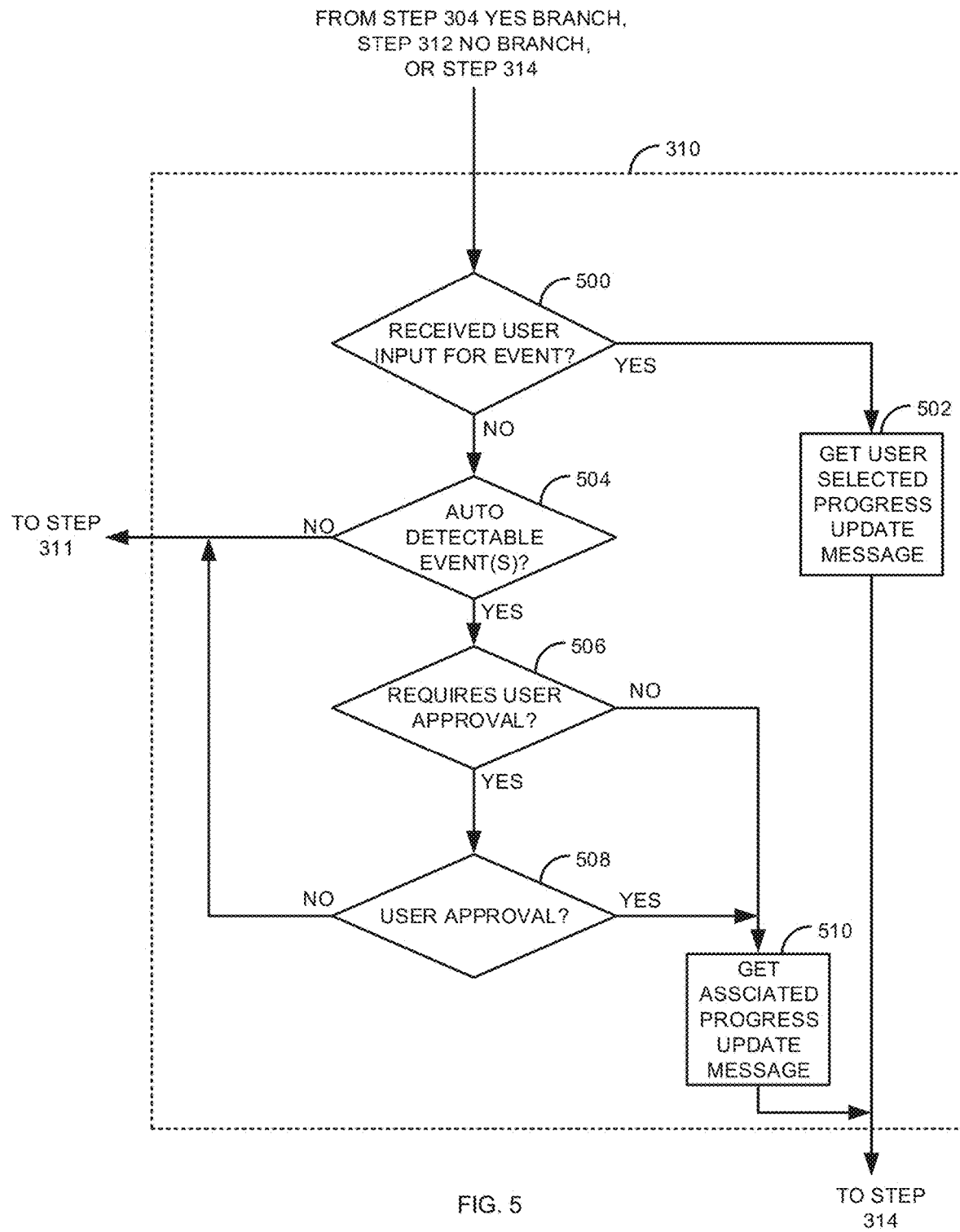
FIG. 5 is a flow diagram for detecting events in order to send progress update messages while a real-time voice or video communication session is on hold or mute.

FIG. 3 is a flow diagram of a process for sending progress update messages while a real-time voice or video communication session is on hold or mute. Illustratively, the communication endpoints 101A-101N, the communication system 120, the communication processor 121, the communication monitor 122, the messaging system 123, the contact center 220, the contact center queues 224, the IVR system 225, and the agent terminals 201A-201N are stored-program-controlled entities, such as a computer or microprocessor, which performs the method of FIGS. 3-5 and the processes described herein by executing program instructions stored in a computer readable storage medium, such as a computer memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300. The communication processor 121 determines, in step 302, if a communication session has been established. For example, the communication processor 121 can determine that a real-time voice communication session has been established between a customer (calling via communication endpoint 101A) and a contact center agent (at the agent terminal 201A). The communication session may be a real-time voice or video communication session. The communication session may be initiated from a communication endpoint 101, initiated from the contact center 220, initiated from an agent terminal 201, and/or the like. The communication session may be a conference communication session between three or more parties. For example, the communication session may be between a contact center agent and two customers at two different communication endpoints 101A-101B. If a communication session has not been established in step 302, the communication processor 121 waits, in step 302, for the communication session to be established.

Once a communication session has been established in step 302, the communication processor 121 determines, in step 304, if the communication session has been placed on hold or mute. For example, if a second party to the communication session (e.g., a contact center agent) has placed the communication session on hold. In another embodiment, the second party (e.g., a contact center agent) may mute themselves. Alternatively, the first party may mute themselves.

If the communication session has not been placed on hold or mute in step 304, the communication processor 121 determines, in step 306, if the communication session has ended. For example, if one party of a two party communication session hangs up. If the communication session has ended in step 306, the process ends in step 308. Otherwise, the process goes back to step 304 to determine if the communication session has been placed on hold or muted.

If the communication session has been placed on hold or muted in step 304, the process (e.g. the communication processor 121 and/or the communication monitor 122) determines if an event(s) has been detected in step 310. The event(s) is typically associated with the party that placed the communication session on hold or mute (e.g., the contact center agent). The event(s) may be based on one or more rules. The one or more rules may be defined by the party who placed the communication session on hold or mute, the party who was placed on hold (e.g., rules sent or defined by a customer prior to or at the initiation of the communication session), an administrator, a contact center supervisor, and/or the like. The event(s) may be an event(s) that is automatically detected by the communication processor 121 and/or the communication monitor 122. The event(s) may be an event that is selected by the party that placed the communication session on hold or mute (e.g., a contact center agent as discussed in FIGS. 4-5).

The event(s) may be that the party that placed the communication session on hold, has: placed a second real-time voice or video communication to a third party, established a second real-time voice or video communication session with a third party, been unable to establish a second real-time voice or video communication with a third party, established a second real-time voice or video communication session with a supervisor or specialist (i.e., based on a telephone number of the supervisor or technical specialist), received a request to establish a second real-time communication session from a third party, been placed on hold or mute, received a document from a third party, ended a real-time voice or video communication session with a third party, sent an email to a third party, received an email from a third party, established an Instant Messaging (IM) session with a third party, failed to establish an IM session with a third party, ended an IM session with a third party, sent a text message to a third party, received a text message from a third party, viewed a document, connected to a database, viewed a web page, initiated a web search, scanned a document, sent a FAX, accessed a social media network (e.g. Facebook® or a customer social media network provided by a company), a checked status of an open query or action item, checked the status of an application, and/or the like.

The event(s) may be an event that is based on a contact center agent waiting to receive something. For example, the contact center agent (or party) may be waiting to receive a communication from a third party (e.g., an email, a text message, an IM, a voice call, a video call, and/or a FAX), waiting to receive a document from a third party, and/or the like. The event may be that the contact center agent is reviewing customer document (e.g., a customer bill), editing a document (e.g., based on key stroke detection from the user), reviewing a video, testing a product (e.g., based on a user input), checking an order, reviewing a prior communication history with the customer (e.g., previous calls, emails, text messages from the customer and/or contact center agent), and/or the like.

The communication monitor 122 can determine whether various types of event(s) are related to the party who is on hold or mute. For example, if the party that is on hold is a customer calling in for technical support on Product X, the communication monitor 122 can process content (e.g., content of a voice call, a text message, a social media site, a document, an email, a web page, etc.) related to the event(s) for key words, such as mentions of Product X or features of Product X. This way the communication monitor 122 can differentiate unrelated event(s) from related event(s). For example, if the contact center agent received an email or document for Product Y while the customer requesting technical support for Product X is on hold, the communication monitor 122 will determine that the email or document event for Product Y is not related to the customer on hold who wants information on Product X. This allows the communication monitor 122 to filter out the email or document event that is related to Product Y. If the agent also receives an email for Product X while the customer is on hold, the communication monitor may detect the event (based on rules) and provide a progress update message. The filtering of events may be based on a product, an issue, and/or the like that is associated with the customer.

If an event(s) is detected in step 310, the messaging system 123 sends a progress update message, in step 314, to the party that has been placed on hold or muted. The progress update message may be sent in one or more mediums. For example, the progress update message may use text, voice, and/or video (e.g., sign language). The progress update message may be a pre-recorded voice or video message that is played to the party on hold or mute. For example, the progress update message may be played to the party on hold based on an application (e.g., the messaging system 123 that is a Back-to-Back User Agent (B2BUA)) that has bridged into the real-time voice or video communication session.

The progress update message may in a different medium than the original voice or video communication session. For example, the progress update message may be a text message that is sent via email, IM, social media channels (e.g., to the caller's social media account(s)), or text messaging to the party that is placed on hold or mute. If the communication session is a video communication session (e.g. multimedia), the progress update message may be in voice and/or video (via text).

The progress update message may include sending or updating a real-time progress bar. For example, a progress bar that indicates that 2 of 5 steps (i.e., 40% of the steps) that are going to be performed by a contact center agent have been completed. The progress update message may be displayed on a mobile application in addition to playing in the communication channel. In addition, an audio only indication of the progress may also be provided.

The progress update message may be sent differently based on the call being muted. For example, if the first party (e.g., a customer) mutes themselves, a Back-to-Back User Agent (B2BUA), which is in the communication path, can interrupt the customer and provide the progress update message to the customer who muted themselves. If the second party (e.g. a contact center agent) has muted themselves, the process works similar to when the contact center agent places the voice or video communication session on hold.

The progress update message may be sent during music-on-hold. For example, the progress update message may interrupt the music-on-hold that is currently being played until the progress update message is completed.

The progress update message typically describes the event. For example, the progress update message may indicate that the party that placed the real-time voice or video communication session on hold or mute: placed a second real-time voice or video communication to a third party, established a second real-time voice or video communication session with a third party, was unable to establish a second real-time voice or video communication with a third party, established a second real-time voice or video communication session with a supervisor or specialist, received a request to establish a second real-time communication session from a third party, received a document from a third party, ended a real-time voice or video communication session with a third party, sent an email to a third party, received an email from a third party, established an Instant Messaging (IM) session with a third party, failed to establish an IM session with a third party, ended an IM session with a third party, has been placed on hold or mute, sent a text message to a third party, received a text message from a third party, viewed a document, connected to a database, viewed a web page, initiated a web search, scanned a document, sent a FAX, accessed a social media network, and/or the like.

The progress update message may be based on a contact center agent (or party) waiting to receive something. For example, the contact center agent may be waiting to receive a communication from a third party (e.g., an email, a text message, an IM, a voice call, a video call, and/or a FAX), waiting to receive a document from a third party, and/or the like. The progress update message may indicate that the contact center agent is viewing a customer document, editing a document, reviewing a video, testing a product, checking an order, reviewing a prior communication history of the customer, and/or the like.

The progress update message may include additional information. For example, if a communication session has been established with the third party, the progress update message may also indicate an estimated time of the second communication session (e.g., based on a prior history). The progress update message may indicate a specific topic being discussed (e.g., based on key words or phrases detected in the second communication session by the communication monitor 122). The progress update message may indicate a name or title of the third party. The progress update message may indicate an amount of time the agent has been talking to or communicating with the third party. The progress update message may be a series of progress update messages that provide an amount of time that a contact center agent has been talking to a third party (e.g., talking with the doctor for one minute, talking with the doctor for two minutes, etc.)

The progress update message may include a question for the first party (e.g., the customer). For example, the call progress update message may indicate that a doctor has approved a surgery date of Dec. 22, 2016. The customer may receive a progress update message that says to the customer, "Your surgery has been approved by the doctor and is scheduled for Dec. 22, 2016. Press 1 to confirm or 2 to request a different date. The customer can the say a requested date/time for the surgery. The customer may answer the question in the progress update message via Dual Tone Multi-Frequency (DTMF), voice (voice recognition), video, IM, email, text, and/or the like).

In other embodiments, the progress update message may ask the customer if the customer want to see an email received or sent by the agent, see a document sent or received by the agent, see a text message sent or received by the agent, see a FAX sent or received by the agent, see a video played to the agent, see an order displayed to the agent, see a communication history of the customer, and/or the like.

Once the progress update message is sent to the party that is on hold or mute, in step 314, the process goes back to step 310 to see if there are any additional events. If there are no events in step 310, the call processor 121 determines, in step 311 if the communication session has ended. For example, if the party on hold or mute has hung up. If the communication session has ended in step 311, the process ends in step 308. Otherwise, if the communication session has not ended in step 311, the communication processor 121 determines if the communication session has been taken off hold in step 312. If the communication session has not been taken off hold in step 312, the process goes back to step 310 to detect any additional events. Otherwise, if the communication session has been take off hold in step 312, the process goes to step 306.

FIG. 4 is a diagram of a user interface 400 for managing progress update messages in a contact center 220. The user interface 400 is an exemplary user interface 400 that is displayed to a contact center agent via an agent terminal 201 in the display 202. The user interface 400 comprises a call status block 410, message sends buttons 401A-401C, progress update messages 411A-411C, hold/take off hold button 420, disconnect button 421, take next call button 422, and approve automatic event window 430.

The call status block 410 comprises a text field that identifies that a voice call is taking place with customer John Doe, a status that indicates that the call is on hold, and a hold duration that indicates that the call has been on hold for 3 minutes and 40 seconds.

The take hold/take off hold button 420 is a button that allows the contact center agent to take a call on and off of hold. In this instance, the call has been placed on hold. The contact center agent may take the call off hold by clicking on the hold/take off hold button 420. When clicked (when the call is on hold), the hold/take off hold button 420 will change to display "place on hold."

The disconnect button allows the contact center agent to disconnect the current call. The take next call button 422 allows the contact center agent to take a new call (e.g., from a contact center queue 224).

As discussed previously, events can be events that are automatically detected by the communication processor 121 and/or the communication monitor 122. In addition, events may be events that are based on input from a contact center agent. For events that are based on input from the contact center agent, the message send buttons 401A-401C allow the contact center agent to send a corresponding progress update message 411A-411C to the party on hold or mute. For example, the contact center agent may click on the message send button 401B to send a pre-defined voice message to the caller on hold or mute that plays the message "connected and consulting with doctor" when the contact center agent calls the doctor to consult with while the customer is on hold.

Some of the events that are automatically detected by the communication processor 121 and/or the communication monitor 122 may require approval by the contact center agent. The automatic event window 430 is an exemplary window that is displayed to the contact center agent when an automatic event is detected that has to be approved before the progress update message is sent to the party on hold or mute. In this example, the communication processor 121 automatically detected the event that there was not an answer by the doctor. Based on a defined rule, the contact center agent has to approve sending the unable to talk to the doctor progress update message. In this example, the contact center agent can either approve sending the progress update message by clicking on the "YES" button in the automatic event window 430 or not approve sending the progress update message by clicking on the "NO" button in the automatic event window 430.

The user interface 400 described in FIG. 4 is discussed in a contact center 220 environment. However, user interface 400 may be used in a non-contact center environment. For example, the user interface may be used by an operator to send progress update messages (e.g., a different set of progress update messages) to callers while the callers are placed on hold or mute.

FIG. 5 is a flow diagram for detecting events in order to send progress update messages while a real-time voice or video communication session is on hold or mute. FIG. 4 is an exemplary embodiment of step 310 of FIG. 3. After the yes branch of step 304, the no branch of step 312, or step 314, the communication monitor 122 determines, in step 500, if there was user input received for an event. For example, the communication monitor 122 can determine that a contact center agent or user has clicked on one of the message sends buttons 401A-401C to send a progress update message. If user input for an event has been received in step 500, the messaging system 123 gets the selected call progress message, in step 502, and the process goes to step 314 where the progress update message is sent to the party on hold or mute.

Otherwise, if there was no user input received in step 500, the communication processor 121 and/or the communication monitor 122 determines if there was an automatically detectable event. For example, any of the events discussed in regard to step 310 may be automatically detected by the communication processor 121 and/or the communication monitor 122.

The communication processor 121 can automatically detect events based on call state messaging. For example, using standard Session Initiation Protocol (SIP) messages, the communication processor 121 can detect that the party that placed the commination session on hold or mute, has placed a second real-time voice or video communication to a third party, established a second real-time voice or video communication session with a third party, been unable to establish a second real-time voice or video communication with a third party (e.g., based on going to voicemail), established a second real-time voice or video communication session with a supervisor or specialist (i.e., based on a telephone number of the supervisor or technical specialist), received a request to establish a second real-time communication session from a third party, ended a real-time voice or video communication session with a third party, has been placed on hold or mute, and/or the like.

The communication processor 121 can automatically detect other types of events. For example, the communication processor 121 can detect that party that placed the communication on hold or mute received a document from a third party (i.e., as an attachment in an email), sent an email to a third party, received an email from a third party, established an Instant Messaging (IM) session with a third party, failed to establish an IM session with a third party, ended an IM session with a third party, sent a text message to a third party, and received a text message from a third party.

The communication processor 121 can automatically detect other types of events based on various criteria. For example, the communication processor 121 can determine that a user is viewing a document, has established a connection to a database (e.g., based on a function call to the database), viewed a web page (e.g., by detecting a communication session to the web page), initiated a web search (i.e., based on information provided by a search engine), scanned a document, testing a product, accessed a social media network, sent a FAX, a checked a status of an open query or action item, checked the status of an application, and/or the like.

The communication monitor 122 may automatically determine that a contact center agent is waiting to receive a communication or document from a third party (e.g., an email, a text message, an IM, a voice call, a video call, and/or a FAX) based on the content of a sent message. For example, the contact center agent may say in a voice call that "please send John Doe's bill." As a result, the communication monitor 122 can detect an event of waiting to receive a document.

The communication monitor 122 may automatically detect events based on a user action. For example, the communication monitor 122 may detect that a contact center agent has opened up a document and is reviewing the document (e.g., a customer bill), editing a document (e.g., based on key stroke detection from the user), reviewing a video (based on the video being displayed in an agent terminal 201), accessing a social media network (e.g., based on a URL of the social media network), reviewing an order, reviewing a prior communication history with the customer (e.g., based on a history file being opened by the contact center agent), and/or the like.

If there are no automatically detectable event(s), in step 504, the process goes to step 311. Otherwise, if there is an automatically detectable event(s) in step 504, the communication monitor 122 determines (based on defined rules) if the automatically detected event requires user approval (e.g., as shown in the automatic event window 430). If the automatically detectable event(s) does not require user approval in step 506, the messaging system 123 gets, in step 510, the progress update message associated with the event. The process goes to step 314 where the progress update message is sent to the user who is on hold or mute.

If the automatically detected event requires user approval, the communication monitor 122 determines, in step 508, if the user has approved that the progress update message to be sent to the user who is on hold or mute. If the user approves sending the progress update message in step 508, the process goes to step 510. Otherwise, the process goes to step 311.

To illustrate the processes described in FIGS. 3-5, consider the following example for a health care contact center 220. A customer makes a voice call to the contact center 220 (e.g., by calling a 1-800 number for the contact center 220) to get pre-approved for open-heart surgery. After the voice communication session has been established (step 302 yes branch) between the customer and a contact center agent, the contact center agent places the voice communication session on hold (step 304 yes branch). While the voice call is on hold, the contact center agent attempts to establish a second communication session with a doctor to review the customer's medial history to see if the surgery is necessary (the event of step 310). As a result, an automatic event (the contact center agent is attempting to call the doctor) is detected, in step 504. The event does not require user approval (in step 506). As a result, the messaging system 123 gets the associated progress update message (step 510) and the progress update message is sent (played) to the user on hold (step 314) indicating that the contact center agent has placed a voice call to a doctor to discuss approval for the surgery.

While still on hold, the contact center agent establishes the voice call and talks with the doctor (a second event that is determined by the call monitor 122 detecting talking in the second communication session, step 504). This event is also an automatically detected event that does not require user approval in step 506. As a result, the messaging system 123 gets the associated progress update message (step 510) and the associated progress update message is sent (played) to the user on hold indicating that the contact center agent is talking to the doctor (step 314). The progress update message may also indicate an approximate call completion time.

The contact center agent and the doctor agree to approve the surgery and agree that the doctor will send an approval letter to the contact center agent. While the contact center agent is waiting to receive the approval letter, the contact center agent selects a message send button 401 to send a message that the contact center agent is waiting to receive an approval letter from the doctor (the event of step 500). As a result, the messaging system 123 gets the user selected progress message that the contact center agent is waiting to receive the approval letter from the doctor and sends (plays) the selected progress message as a voice message to the customer who is on hold. After receiving the approval letter, the contact center agent takes the voice call off hold (step 312) and informs the customer that the open-heart surgery has been approved.

To further illustrate, consider the following example for an airline contact center 220. A customer makes a video call to the contact center 220 to find out the status of the customer's lost baggage. After the video communication session has been established (step 302 yes branch) between the customer and a contact center agent, the contact center agent places the voice communication session on hold (step 304 yes branch). While the video call is on hold, the contact center agent establishes a second communication session to the airport staff. When the contact center agent connects with the airport staff the contact center agent selects a message send button 401 that has an associated message that indicates that contact center agent is connected to the airport staff and will shortly connect with the customer in approximately three minutes (the event of step 500). As a result, the messaging system 123 gets the associated progress update message (step 502) and sends the associated progress update message as text captioning in the video communication session that is on hold.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network 110, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
place a first real-time voice or video communication session on hold or mute, wherein the first real-time voice or video communication session is with a first communication endpoint of a first party that is placed on hold or mute by a second communication endpoint of a second party;
while the first real-time voice or video communication session is placed on hold or mute, detect that the second communication endpoint has received a request to establish a second real-time voice or video communication session from a third communication endpoint of a third party while the first real-time voice or video communication session is placed on hold or mute;
determine that the second real-time voice or video communication session relates to the first party; and
in response to determining that the second real-time voice or video communication session relates to the first party, send a progress update message in the first real-time voice or video communication session to the first communication endpoint while the first real-time voice or video communication session is on hold or mute, wherein the progress update message indicates that the second party has received the request.

2. The system of claim 1, wherein the progress update message indicates the estimated time of completion of the second real-time voice or video communication session.

3. The system of claim 1, wherein the progress update message further indicates at least one of: a topic being discussed in the second real-time voice or video communication session and the second party is talking to the third party in the second real-time voice or video communication session.

4. The system of claim 1, further comprising detecting the second communication endpoint is placing a third real-time voice or video communication session to a fourth communication endpoint of a fourth party while the first real-time voice or video communication session is placed on hold or mute and wherein the progress update message further indicates that the second communication endpoint has placed the third real-time voice or video communication session to the fourth communication endpoint.

5. The system of claim 1, further comprising detecting the second communication endpoint has sent or received a document to or from the third communication endpoint while the first real-time voice or video communication session is placed on hold or mute and the progress update message further indicates that the second party has sent or received the document to or from the third party.

6. The system of claim 1, further comprising detecting the second communication endpoint was unable to establish a third real-time voice or video communication session with a fourth communication endpoint of a fourth party while the first real-time voice or video communication session is placed on hold or mute and wherein the progress update message further indicates that the second party was unable to establish the third real-time voice or video communication session.

7. The system of claim 1, further comprising detecting one or more events that the second communication endpoint has or is at least one of: ended a real-time voice or video communication session with the third communication endpoint of the third party, been placed on hold or mute, sent an email to the third communication endpoint of the third party, received an email from the third communication endpoint of the third party, established an Instant Messaging (IM) session with the third communication endpoint of the third party, ended the IM session with the third communication endpoint of the third party, failed to establish the IM session with the third communication endpoint of the third party, sent a text message to the third communication endpoint of the third party, received a text message from the third communication endpoint of the third party, displayed a document, connected to a database, displayed a web page, received a web search, scanned a document, sent a FAX, established a second real-time voice or video communication session with a supervisor or specialist, waiting to receive a communication, waiting to receive a document, displaying a customer document, receiving input that the second party is editing a document, displaying a video, accessing a social media network, receiving input that the second party is testing a product, displaying an order, checking a status of an open query or action item, checking the status of an application, or displaying a prior communication history of a customer.

8. The system of claim 1, wherein the progress update message is sent to the first communication endpoint based on an input from the second party.

9. The system of claim 1, wherein the instructions further program the microprocessor to detect an occurrence of an event and filter the event to determine whether the event is associated with the first party prior to sending the progress update message.

10. The system of claim 1, wherein the progress update message further comprises a question that the first party can answer.

11. A method comprising:
  placing, by a microprocessor, a first real-time voice or video communication session on hold or mute, wherein the first real-time voice or video communication session is with a first communication endpoint of a first party that is placed on hold or mute by a second communication endpoint of a second party;
  while the first real-time voice or video communication session is placed on hold or mute, detecting, by the microprocessor, that the second communication endpoint has received a request to establish a second real-time voice or video communication session from a third communication endpoint of a third party while the first real-time voice or video communication session is placed on hold or mute;
  determining the second real-time voice or video communication session relates to the first party; and
  in response to determining that the second real-time voice or video communication session relates to the first party, sending, by the microprocessor, a progress update message in the first real-time voice or video communication session to the first communication endpoint while the first real-time voice or video communication session is on hold or mute, wherein the progress update message indicates that the second party has received the request.

12. The method of claim 11, wherein the progress update message further indicates at least one of: a topic being discussed in the second real-time voice or video communication session and the second party is talking to the third party in the second real-time voice or video communication session.

13. The method of claim 11, further comprising detecting the second communication endpoint is placing a third real-time voice or video communication session to a fourth communication endpoint of a fourth party while the first real-time voice or video communication session is placed on hold or mute and wherein the progress update message further indicates that the second communication endpoint has placed the third real-time voice or video communication session to the fourth communication endpoint.

14. The method of claim 11, further comprising detecting the second communication endpoint has sent or received a document to or from the third communication endpoint while the first real-time voice or video communication session is placed on hold or mute and the progress update message further indicates that the second party has sent or received the document to or from the third party.

15. The method of claim 11, further comprising detecting the second communication endpoint was unable to establish a third real-time voice or video communication session with a fourth communication endpoint of a fourth party while the first real-time voice or video communication session is placed on hold or mute and wherein the progress update message further indicates that the second party was unable to establish the third real-time voice or video communication session.

16. The method of claim 11, further comprising detecting one or more events that the second communication endpoint has or is at least one of: ended a real-time voice or video communication session with the third communication endpoint of the third party, been placed on hold or mute, sent an email to the third communication endpoint of the third party, received an email from the third communication endpoint of the third party, established an Instant Messaging (IM) session with the third communication endpoint of the third party, ended the IM session with the third communication endpoint of the third party, failed to establish the IM session with the third communication endpoint of the third party, sent a text message to the third communication endpoint of the third party, received a text message from the third communication endpoint of the third party, displayed a document, connected to a database, displayed a web page, received a web search, scanned a document, sent a FAX, established a second real-time voice or video communication session with a supervisor or specialist, waiting to receive a communication, waiting to receive a document, displayed a customer document, receiving input that the second party is a document, displaying a video, accessing a social media network, receiving input that the second party is testing a product, displaying an order, checking a status of an open query or action item, checking the status of an application, or displaying a prior communication history of a customer.

17. The method of claim 11, wherein the progress update message is sent to the first communication device based on an input from the second party.

18. A contact center comprising:
  a microprocessor; and
  a computer readable medium, coupled with the microprocessor and comprising microprocessor readable and executable instructions that program the microprocessor to:
    place a first real-time voice or video communication session on hold or mute, wherein the first real-time voice or video communication session is with a first communication endpoint of a first party that is placed on hold or mute by a communication endpoint of a contact center agent;
    while the first real-time voice or video communication session is placed on hold or mute, detect that the communication endpoint of the contact center agent has received a request to establish a second real-time voice or video communication session from a second communication endpoint of a second party while the first real-time voice or video communication session is placed on hold or mute;
    determine that the second real-time voice or video communication session relates to the first party; and
    in response to determining that the second real-time voice or video communication session relates to the first party, send a progress update message in the first real-time voice or video communication session to the first communication endpoint while the first real-time voice or video communication session is on hold or mute, wherein the progress update message indicates that the communication endpoint of the contact center agent has received the request to establish the second real-time voice or video communication session.

19. The contact center of claim 18, further comprising detecting the communication endpoint of the contact center agent is placing a third real-time voice or video communication session to a third communication endpoint of a third party while the first real-time voice or video communication session is placed on hold or mute and the progress update message further indicates that the communication endpoint of the contact center agent has placed the third real-time voice or video communication session.

20. The contact center of claim 18, further comprising detecting the communication endpoint of the contact center agent has sent or received a document to or from the second communication endpoint while the first real-time voice or video communication session is placed on hold or mute and the progress update message further indicates that the contact center agent has sent or received the document to or from the second communication endpoint.

* * * * *